(12) United States Patent
Pankajakshan et al.

(10) Patent No.: US 7,191,332 B1
(45) Date of Patent: Mar. 13, 2007

(54) DIGITAL RIGHTS MANAGEMENT FOR MULTICASTING CONTENT DISTRIBUTION

(75) Inventors: Bejoy Pankajakshan, Mission, KS (US); Benjamin J. Parker, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 676 days.

(21) Appl. No.: 10/441,748

(22) Filed: May 20, 2003

(51) Int. Cl.
*H04L 9/00* (2006.01)
(52) U.S. Cl. .................. 713/163; 713/160; 726/26
(58) Field of Classification Search .................. None
See application file for complete search history.

(56) References Cited

U.S. PATENT DOCUMENTS

| | | | | |
|---|---|---|---|---|
| 6,330,671 | B1* | 12/2001 | Aziz | 713/163 |
| 6,728,878 | B2* | 4/2004 | Dillon | 713/160 |
| 6,996,248 | B2* | 2/2006 | Fudge et al. | 382/100 |
| 7,036,011 | B2* | 4/2006 | Grimes et al. | 713/156 |
| 2002/0002674 | A1 | 1/2002 | Grimes et al. | |

OTHER PUBLICATIONS

Pruneda et al., Packaging Your Content Using Windows Media Rights Manager 1, Microsoft Corporation, Apr. 1999, Retrieved from the Internet on Jun. 23, 2006: <URL: http://msdn.microsoft.com/library/default.asp?url=/library/en-us/dnwmt/html/drm.asp>.*
Whitepapers—Windows Media Security Issues, California Software Labs, Jul. 2001, Retrieved from the Internet on Jun. 23, 2006: <URL: http://www.cswl.com/whitepapers/windows-media.html>.*
MS Digital Broadcast Manager for Windows Media, Microsoft Corporation, Feb. 2000, Retrieved from the Internet on Jun. 23, 2006: <URL: http://www.microsoft.com/technet/prodtechnol/netshow/maintain/dbmwp.mspx?pf=true>.*
Q. Liu, R. Safavi-Naini, N.P. Sheppard, *Digital Rights Management for Content Distribution*, Australasian Information Security Workshop 2003.
Cisco Application and Content Networking System, (ACNS) Version 4.1 Software, 1992-2002, pp. 1-11.
Consumer Broadband Revenue Generation Becomes a Reality—BCD Forum Interoperability Demonstration at SUPERCOMM 2002.
The ATM Forum, *Broadband Content Delivery*, 2002.

* cited by examiner

*Primary Examiner*—Gilberto Barrón, Jr.
*Assistant Examiner*—Minh Dinh (57) ABSTRACT

Licensed multimedia content is distributed to users electronically via an internetwork. An archive stores packaged content files wherein each packaged content file includes encrypted multimedia content and protection identification information, and wherein the encrypted multimedia content can be decrypted using a respective key corresponding to the protection identification information. A multicast server is coupled to the archive for providing multicast streams of the packaged content files to the internetwork. A web server provides announcements corresponding to the packaged content files, each announcement including multicast link information. A digital rights server stores each of the respective keys in association with the protection identification information. A user can access one of the announcements from the web server, join a corresponding one of the multicast streams to receive the protection identification information, contact the digital rights server in response to the protection identification information to obtain the respective key from the digital rights server after providing predetermined authorization information to the digital rights server, receive the encrypted multimedia content from the one multicast stream, and decrypt the encrypted multimedia content in response to the respective key.

23 Claims, 5 Drawing Sheets

DIGITAL RIGHTS MANAGEMENT FOR MULTICASTING CONTENT DISTRIBUTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to digital distribution of copyrighted content via an internetwork, and, more specifically, to secure distribution using multicasting.

Computer networks, such as the Internet, are becoming an important means for distributing digital content such as multimedia files. The multimedia content can include audio and video recordings such as music and feature films, respectively. The recordings may be for entertainment purposes or may be educational programs as part of a distance-learning educational system, for example.

In order to protect the rights of copyright owners of the distributed multimedia content, protection systems such as encryption and watermarking are used to restrict use of distributed content. Various digital rights management (DRM) models are being deployed to support Internet distribution of multimedia content. In general, content acquisition and license acquisition are separate operations. Thus, an encrypted file can be distributed to various end-users who will only be able to actually the view or listen to the content after separately obtaining an appropriate license. The grant of a license may depend upon authentication and authorization of a specific user and/or purchasing of the license. The granted license many include specific rules for the usage such as a limited number of times for playing the content or an expiration date.

The distribution of the multimedia file to numerous recipients (whether from a central distribution point or between end-users) within an internetwork can consume a large amounts of bandwidth. Packets or datagrams transported over a computer network for distributing content files protected using DRM are typically sent as unicast messages and wherein each copy of the distributed file is sent separately from point-to-point. Multicasting is a known the technique for distributing content more efficiently between a single content server and multiple recipients. However, many individual networks connected within the Internet are not multicast capable. Furthermore, DRM systems are oriented toward unicast distribution rather than multicast.

Multicasting can result in significantly more efficient use of overall network resources since multiple copies of the same information packets between any sender/receiver pair are avoided. Reduction in traffic loads can be especially significant in the network backbone.

In the IP protocol, multicast messages use reserved IP addresses (Class D) set aside for multicast groups. For example, a source server or host may distribute streaming multimedia (e.g., video and/or audio) or other information as datagrams specifying a particular multicast group number in the destination address. The datagrams propagate via multicast-enabled routers which typically maintain local group databases identifying next-hop routers and/or end user destinations that have requested receiving datagrams from the multicast group (i.e., that have joined). If a router's database identifies more than one destination for a multicast group, the router replicates the datagram and sends it to each destination.

When a router receives a join message for a multicast group that it is not currently receiving, then the router uses a multicast routing protocol such as Protocol-Independent Multicast (PIM) to create the necessary links from a source of the multicast stream to itself. When no longer needed, the router eliminates or prunes multicast distribution links to it that are no longer needed.

When distributing streams of multimedia content, the distributed content and the player can be configured to allow a user to join the multicast group while the stream is in progress and begin to view or listen to the content at an intermediate point. If, however, the content is encrypted using DRM then it has not been possible to obtain a license until at least the beginning portions of a particular file have been received.

SUMMARY OF THE INVENTION

The present invention has the advantage of allowing secure multicast transmission of content in a manner compatible with digital rights management. Large scale distribution of protected content is achieved with high bandwidth efficiency.

In one aspect of the invention, a system is provided for distributing licensed content to users via an internetwork. An archive stores packaged content files wherein each packaged content file includes encrypted multimedia content and protection identification information, and wherein the encrypted multimedia content can be decrypted using a respective key corresponding to the protection identification information. A multicast server is coupled to the archive for providing multicast streams of the packaged content files to the internetwork. A web server provides announcements corresponding to the packaged content files, each announcement including multicast link information. A digital rights server stores each of the respective keys in association with the protection identification information. A user can access one of the announcements from the web server, join a corresponding one of the multicast streams to receive the protection identification information, contact the digital rights server in response to the protection identification information to obtain the respective key from the digital rights server after providing predetermined authorization information to the digital rights server, receive the encrypted multimedia content from the one multicast stream, and decrypt the encrypted multimedia content in response to the respective key.

DETAILED DESCRIPTION OF PREFERRED EMBODIMENTS

Figure 1:
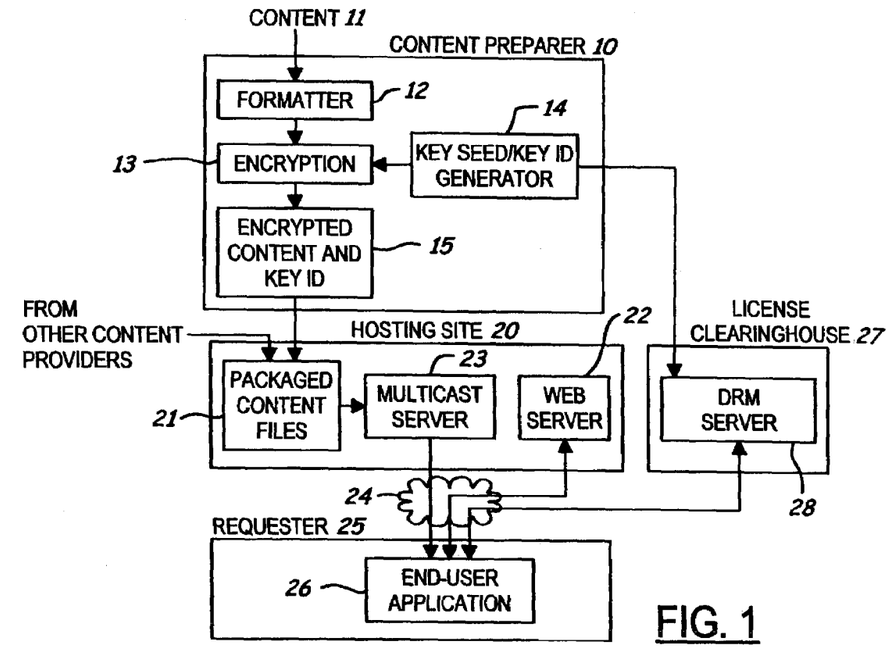
FIG. 1 is a block diagram showing a distribution system of the present invention.

Referring to FIG. 1, a licensed content distribution system is shown wherein licensed content 11 packaged by a content preparer 10 is delivered to a user or requester 25 via a hosting site 20 with licenses being obtained from a license clearinghouse 27. Hosting site 20, user/requester 25, and license clearinghouse 27 are connected by an internetwork 24, such as the Internet. The licensed content may be comprised of copyrighted music or audiovisual works, confidential material, or any content desired to be shared over internetwork 24 to a limited number of recipients or to paying customers, for example. Prior to delivery, the content 11 must be properly formatted and packaged for multicast distribution.

Content preparer 10 obtains content 11 from a content owner (not shown) to begin the packaging process. First, content 11 is formatted in a formatter 12 such as an encoder or transcoder to provide a streaming file format that is readable by a multimedia player (e.g., Windows Media Player) that is compliant with a DRM system to be used. Formatting may convert any original multimedia file format (e.g., .wav, .mp3, mpg, or .avi files) into Microsoft .wma, .wmv, or .asf formats, for example. Using a digital rights application (e.g., Windows Media Rights Manager), an encryption process 13 uses a key seed to produce a key and a key ID using a generator 14 to create a packaged content file 15 including encrypted multimedia content and protection identification information. Conventional key seed and key ID generation and conventional encryption methods can be used.

As used herein, the protection identification information preferably includes the key ID and an IP address or URL pointing to license clearinghouse 27. Alternatively, a content or other ID could be used instead of the key ID as long as the ID can be used by the license clearinghouse to identify the appropriate key to provide to a licensed user. Also, the IP address or URL could be omitted if the user application (i.e., media player) is otherwise aware of the address of license clearinghouse 27.

The protection identification information is preferably packaged into a file header of packaged content file 15 and repetitively throughout the file so that the information can be retrieved by a media player that joins a multicast stream while the streaming is already in progress. If, for example, packaged content file 15 is an .asf file which packetizes the multimedia content data to facilitate streaming, appropriate objects containing the protection identification information are inserted into file 15 during the packaging process. The inserted objects may correspond to every data packet or may be included after each nth packet, where n is an integer greater than 1.

Packaged content file 15 is delivered to an archive 21 in a hosting site 20 for storing a plurality of packaged content files (potentially from a plurality of content providers and/or packagers), while the key seed, key ID, and licensing terms for accessing the content are delivered to license clearinghouse 27. Hosting site 20 preferably also includes a web server 22 and a multicast server 23. While multicast server 23 and archive 21 would typically be located together (e.g., in the same LAN), web server 22 could be in a remote location. Web server 22 provides advertisement of the available content files. For example, html web pages may provide descriptions of content as well as licensing requirements. The web pages include a reference (e.g., in the form of an .asx file) that points to (e.g., provides the URL of) a multicast stream announcement file that contains the multicast link information necessary for the user application to join the multicast stream. For instance, the announcement file may be comprised of an .nsc file including a multicast IP address (i.e., group number), port, stream format, and the like. The .nsc file may preferably reside on multicast server 23, but can be located at any accessible location.

Prior art unicast distribution of pre-recorded and pre-packaged content files initiated streaming with the beginning of the file being acquired. Therefore, only a single file header at the beginning of the file needed to contain the key ID and license-acquisition URL. Thus, if a content file packaged according to the prior art were to be multicast, then a user application joining a multicast group while the streaming was in progress could only determine the necessary protection identification information (i.e., key ID and license-acquisition URL) by waiting for another cycle of the stream to begin (assuming it was repeated). The present invention avoids that problem by packaging the protection identification information repetitively within the streamed packaged content files. Thus, the key ID and the clearinghouse URL can be quickly determined by end-user application 26 which then proceeds to contact a DRM server 28 at clearinghouse 27 to obtain a license in the conventional manner.

Figure 2:
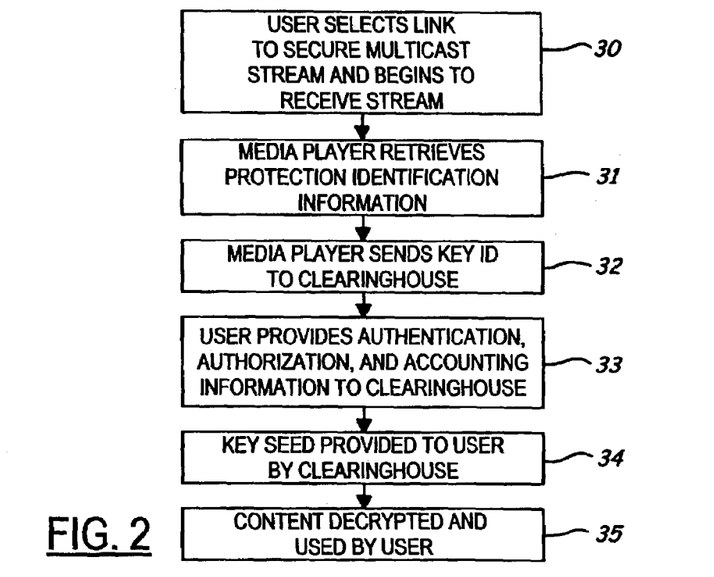
FIG. 2 is a flowchart showing an overall method of the present invention.

An overall method for a user to receive distribution and to reproduce as desired licensed content file is shown in FIG. 2. The user accesses advertisements of available multimedia content by browsing web pages on the web server and selecting a hyperlink pointing to the multicast announcement file (e.g., .nsc file) in step 30. A compatible media player application (e.g., Window Media Player, version 9) recognizes the announcement file and uses the associated information to access the streaming file content from the multicast server. The file streams may be continuously repeated or may occur at scheduled (advertised) times, for example. In step 31, the media player, or other end-user application, retrieves the protection identification information so that it can contact the license clearinghouse with an access request in step 32 which identifies the packaged content file that the user wishes to listen to or view. Identification of the file may be provided by the key ID or another content identifier.

Based on the identity of the content being accessed, the DRM server determines the available license grants and the corresponding licensing requirements to be fulfilled by the requesting user. In step 33, a challenge-response authorization sequence is performed in which the user may be required to provide authentication, authorization, and accounting information to the DRM server. If it is determined that a license can be granted to the user, then a license including the key seed for decrypting the multimedia content and any usage rules is sent to the user in step 34. Upon receiving the license, the end-user application proceeds to access the multicast stream and to decrypt and output the multimedia content. The license is preferably stored on the user's computer and, depending on the permissions granted in the license, the content file may be stored on the user's computer as well.

Figure 3:
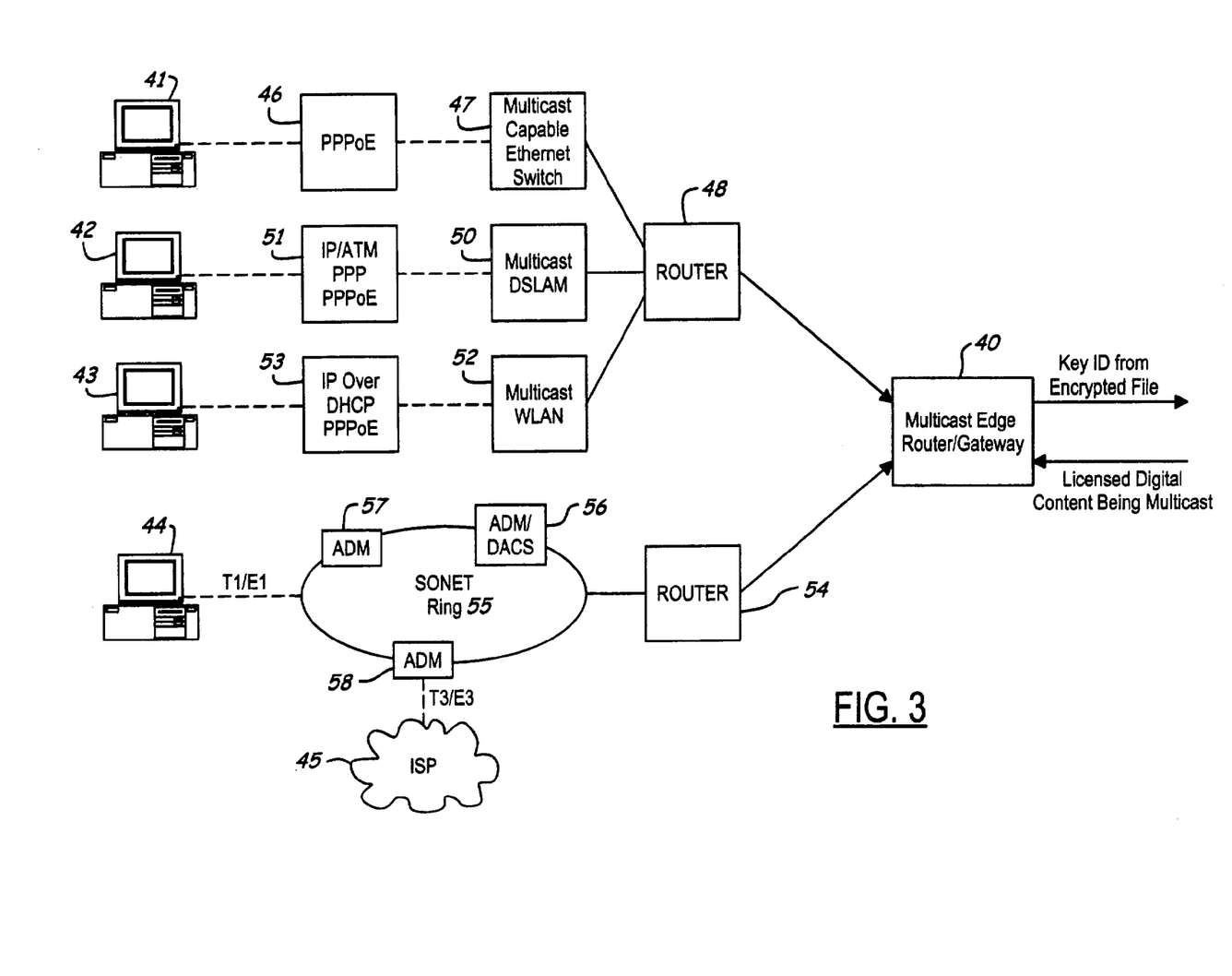
FIG. 3 is a block diagram showing multicast distribution for several different access methods.

FIG. 3 shows different end-to-end multicast scenarios for delivering content files to users. A multicast edge router/gateway 40 may be in or near the network backbone for communicating with the multicast and DRM servers (not shown) and allows a service provider to offer multicasting service to users via private line services, direct broadband access, of access from enterprise IP networks or from a lower tier ISP, for example. The use of channelized interfaces is preferred in order to reduce the complexity of the ILEC/CLEC transmission network and the ISP edge network. Different users 41–44 are shown as being connected by different types of network topologies. User 41 is connected to multicast-capable Ethernet switch 47 (e.g., in a cable network) using point-to-point over Ethernet (PPPoE) protocol 46. Switch 47 is coupled to a router 48 for communicating with multicast edge router/gateway 40. A user 42 is connected to router 48 via a multicast-enabled DSLAM device 50 using either IP or ATM protocols 51. A user 43 is connected to router 48 via a wireless LAN access point 52 using IP over DHCP or PPPoE protocols, for example. Another user 44 is connected to a router 54 via a SONET ring 55 and a T1/E1 connection. SONET ring 55 may include add-drop multiplexer/digital access cross-connect system (ADM/DACS) 56 and ADM's 57 and 58, as shown. Other users (not shown) may be receive multicast traffic via a second tier ISP 45 via a T3/E3 connection, for example.

For each of these access methods over multicast capable networks (i.e., xDSL, Wireless LAN, Cable, and Ethernet), the edge router acts as an intelligent Layer 3 device which aggregates traffic from Layer 2 devices including DSLAMs, cable modem termination systems (CMTS's), wireless LAN access points, and Ethernet switches and which also passes information from the end user to the remote hosts related to identifying and accessing the encrypted file.

Figure 4:
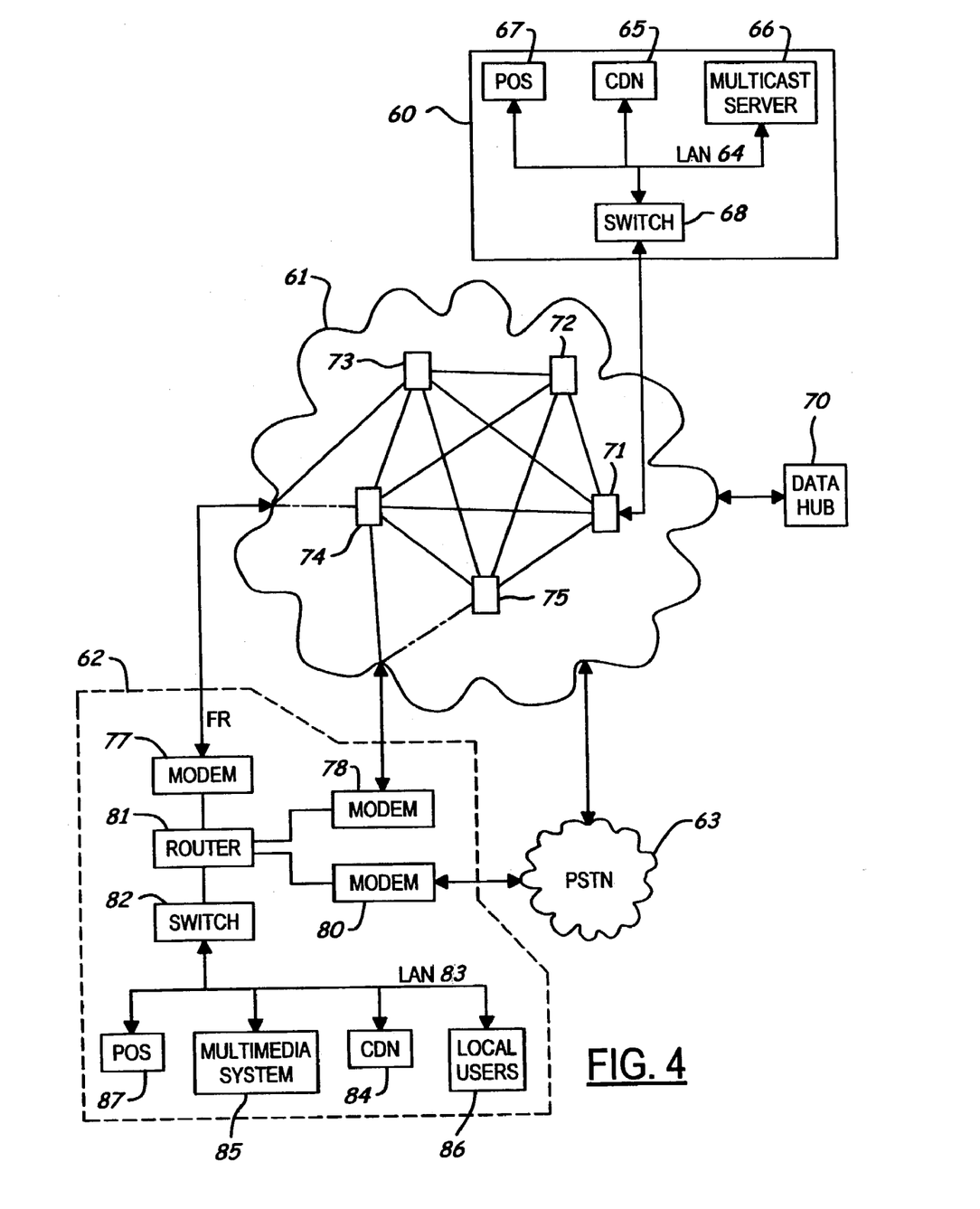
FIG. 4 is a block diagram showing an alternative embodiment for a distribution system.

FIG. 4 illustrates another embodiment of the invention which includes both multicast distribution and a high priority point-to-point distribution to an auxiliary distribution point such as a movie theatre or a multimedia kiosk, for example. A hosting site 60 is coupled to a network 61, such as the Internet. Hosting site provides multicast streaming of content files within network 61 as described above. The present embodiment provides an additional private channel for high priority, secure transfer via a tunnel, such as a virtual private network (VPN). An auxiliary distribution point 62 is connected directly to network 61 and connected indirectly via a public switched telephone network 63 as an emergency backup if the direct connections fail.

In this embodiment, all the hosting function are integrated at one hosting site 60 using a business model that distributes multimedia content from a plurality of content providers. A hosting LAN 64 interconnects a content delivery network (CDN) 65, a multicast server 66, and a point of sale (POS)/DRM system 67. A switch/router 68 connects hosting LAN 64 with network 61. Packaged or unpackaged content files can be uploaded to hosting site 60 by various content providers from a data hub 70, for example. If sent unpackaged, then packaging may be performed at hosting site 60 using CDN 65, for example.

CDN 65 provides the archive of stored packaged content files in addition to browsable advertisements and multicast links identifying multicast streams from multicast server 66. POS 67 provides an efficient platform for implementing paid subscription services based on DRM licensing. POS 67 preferably comprises a server implementing conventional DRM and financial transaction protocols, such as the secure electronic transaction (SET) protocol for electronic bank card (e.g., credit card or other account) payments.

A tunnel between hosting site 60 and auxiliary distribution point 62 via network 61 is created using selected ones of VPN-capable routers 71–75. For optimum download speed and reliability, a first tunnel may provide a frame relay (FR) connection to an FR modem 77 at auxiliary distribution point 62. Primary and backup FR tunnels may be provided. A second tunnel may include a backup DSL connection to a DSL modem 78. Yet another backup may be provided by a dialup connection from a dialup modem 80 to PSTN 63.

Modems 77, 78, and 80 are concentrated at a router 81 which is coupled by a switch 82 to a LAN 83. Packaged content files received via the primary or backup tunnels are delivered to and stored by a CDN 84. An operator of auxiliary distribution point 62 (e.g., a movie theater), can publicly display the licensed content using a multimedia system 85 capable of reproducing the digital content. In addition, the locally stored packaged content files can be further distributed from CDN 84 to local users 86 (e.g., other local movie theaters) via LAN 83 or a WAN or a MAN. The key obtained for each packaged content file stored in CDN 84 is provided to a POS/DRM server 87 which controls the licensing and accounting functions for the distribution to local users 86. Accounting information can then be passed back to the main POS server 67 via network 61, if desired.

Figure 5:
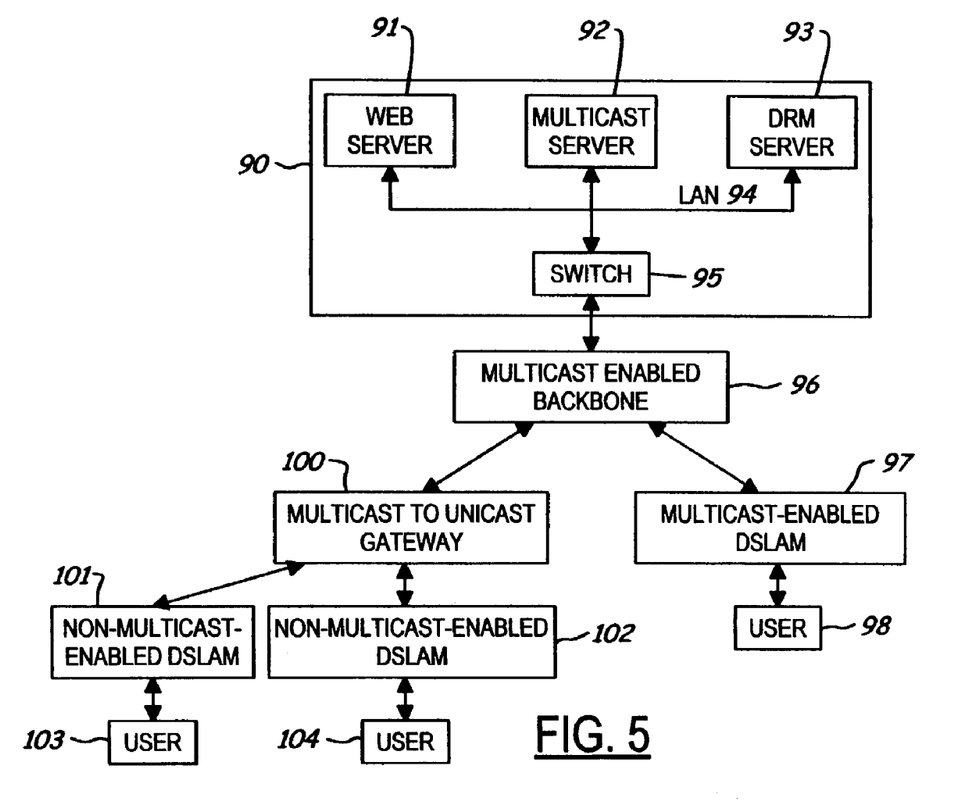
FIG. 5 is a block diagram showing a distribution system to users via both multicast and non-multicast networks.

FIG. 5 shows a network embodiment for licensed content distribution to users whose access to the internetwork is not multicast enabled while maintaining the benefits of multicasting within the internetwork backbone. Additionally, FIG. 5 shows a hosting site 90 integrating a web server 91, a multicast server 92, and a DRM server 93 all integrated into the same site. This structure allows a business model wherein an individual service provider can act as a broker for distributing, licensing, and fee collection on behalf of any content providers. These content providers could include 1) entertainment companies distributing feature films, audio recordings, or sports and news broadcasts by subscription or pay-per-access, or 2) training/education organizations distributing recorded video or audio training materials for a distance-learning educational system, for example. In the case of a distance-learning system, the DRM licensing process could be used to mark attendance registers of long-distance students.

Hosting site 90 is coupled by a switch 95 to a multicast enabled backbone 96. A multicast enabled DSLAM 97 provides multicast traffic to an end user 98 as described in the previous embodiments. For serving users who cannot receive multicast traffic, a multicast-to-unicast gateway 100 is coupled to backbone 96. Non-multicast-enabled DSLAM's 101 and 102 are connected to gateway 100 and to users 103 and 104, respectively. Gateway 100 may be comprised of a Unisphere 1400 ERX edge router available from Juniper Networks, Inc., for example, to provide a unicast tunnel to the multicast stream from backbone 96. Alternatively, gateway 100 could be replaced with a multicast address resolution server (MARS) creating a permanent virtual circuit (PVC) to end users 103 and 104. Proposed IETF standards based on switched virtual circuit (SVC) and MARS could also be used.

Figure 6:
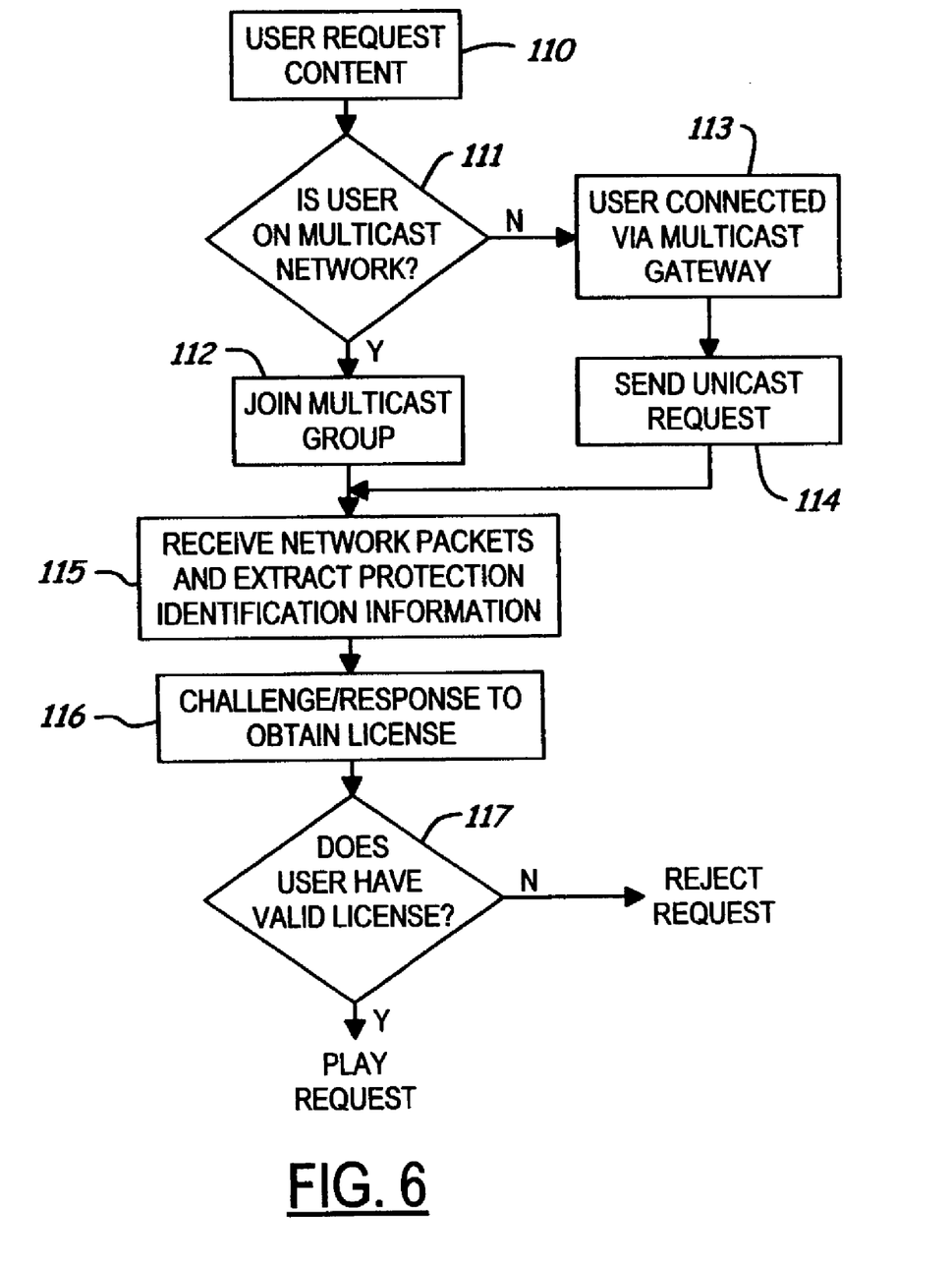
FIG. 6 is a flowchart showing a process used by a player in the present invention.

FIG. 6 illustrates a preferred method of operation for a media player according to the present invention. In step 110, a user requests access to a content file (e.g., by selecting a link to an .nsc file while browsing to the web server). In step 111, the media player checks to determine whether the user is connected to a multicast-enabled network. If so, then the media player issues a join request for the identified multicast group in step 112. If not, then the media player sets up a tunnel to a multicast gateway in step 113 and issues a unicast request to the gateway in step 114. In step 115, the media player receives network packets of the streaming content and extracts the protection identification information. Using that information (e.g., the license clearinghouse URL and the key ID), the media player initiates a licensing challenge/response sequence in step 116. In step 117, the media player checks whether the user has obtained a valid license grant for the content and evaluates any rules or limitations of the license grant that affect a requested operation (e.g., playback or writing to a CD). If the license and requested operation are valid, then the requested operation is performed (e.g., the content is played). Otherwise, the request is rejected.

The foregoing invention has successfully tied together multicast distribution of multimedia content with the protection of that content using digital rights management. Thus, large scale distribution can be achieved while making efficient use of network bandwidth capacity. The content packaging, multicast streaming, and licensing functions can each be made available as distinct application services or can be integrated at one hosting site to operate as a broker for electronic distribution.

What is claimed is:

1. A system for distributing licensed content to users via an internetwork, said system comprising:
   an archive storing packaged content files wherein each packaged content file includes encrypted multimedia content and protection identification information, and wherein said encrypted multimedia content can be decrypted using a respective key corresponding to said protection identification information;
   a multicast server coupled to said archive for providing multicast streams of said packaged content files to said internetwork, wherein each of said streams includes repetitive transmission of said respective protection identification information within a respective content file, wherein each of said streams comprises a plurality of packets, and wherein said respective protection identification information comprises inserted objects that are included in each of said streams after each nth packet, where n is an integer greater than 1;
   a web server for providing announcements corresponding to said packaged content files, each announcement including multicast link information; and
   a digital rights server storing each of said respective keys in association with said protection identification information;
   whereby a user can access one of said announcements from said web server, join a corresponding one of said multicast streams to receive said protection identification information, contact said digital rights server in response to said protection identification information to obtain said respective key from said digital rights server after providing predetermined authorization information to said digital rights server, receive said encrypted multimedia content from said one multicast stream, and decrypt said encrypted multimedia content in response to said respective key.

2. The system of claim 1 wherein each of said packaged content files repetitively provides respective protection identification information and file format information for use by a multimedia player in reproducing said licensed content.

3. The system of claim 1 wherein said protection identification information contained in respective packaged content files each includes a respective key identifier for uniquely identifying a respective key.

4. The system of claim 3 wherein said protection identification information contained in respective packaged content files each includes a respective key identifier and an address pointing to said digital rights server.

5. The system of claim 1 wherein said multicast link information is comprised of a multicast announcement file.

6. The system of claim 1 wherein said digital rights server provides a license file in response to a user request, said license file including a respective key for decrypting said corresponding encrypted multimedia content.

7. The system of claim 6 wherein said license file further includes a set of usage rules for limiting usage of said encrypted multimedia content.

8. The system of claim 1 wherein said packaged content files include video recordings.

9. The system of claim 8 wherein said video recordings are included in a distance-learning educational system.

10. The system of claim 8 wherein said video recordings are included in a feature film distribution system.

11. The system of claim 1 wherein said packaged content files include audio recordings.

12. The system of claim 11 wherein said audio recordings are included in a music distribution system.

13. The system of claim 1 further comprising:
   a multicast-to-unicast gateway coupled between said multicast server and said user.

14. The system of claim 1 wherein said archive, said multicast server, and said web server are integrated into a hosting site for providing content originating from a plurality of content providers.

15. The system of claim 14 wherein said digital rights server includes electronic payment capability and said predetermined authorization information includes a payment account.

16. The system of claim 15 wherein said digital rights server is integrated into said hosting site.

17. The system of claim 1 further comprising:
   an auxiliary distribution point; and
   a distribution tunnel comprised of a virtual private network coupled between said multicast server and said auxiliary distribution point.

18. The system of claim 17 wherein said auxiliary distribution point comprises a movie theater for displaying said licensed content.

19. A method of distributing licensed content to users via an internetwork, said method comprising the steps of:
   archiving packaged content files wherein each packaged content file includes encrypted multimedia content and protection identification information, and wherein said encrypted multimedia content can be decrypted using a respective key corresponding to said protection identification information;
   multicasting said encrypted multimedia content to said internetwork in a stream, wherein said stream includes repeated transmission of said protection identification information within a respective content file, wherein said stream comprises a plurality of packets, and wherein said respective protection identification information comprises inserted objects that are included in said stream after each nth packet, where n is an integer greater than 1;
   making available within said internetwork a plurality of content descriptors and a plurality of multicast announcement files, wherein said content descriptors identify respective encrypted multimedia content and point to respective multicast announcement files, and wherein said multicast announcement files include multicast link information for receiving respective multicast streams of said encrypted multimedia content;
   receiving a user selection of a desired content descriptor and forwarding a corresponding multicast announcement file to said user;
   broadcasting a respective multicast stream receivable by said user so that respective protection identification information corresponding to said user selection is available to said user;

receiving at a digital rights server a user access request including said protection identification information, said digital rights server storing each of said respective keys in association with said protection identification information;

said digital rights server validating said access request; and said digital rights server transmitting a respective key corresponding to said protection identification information to said user after validating said access request to allow said user to decrypt said encrypted multimedia content corresponding to said key identifier.

20. The method of claim 19 wherein said protection identification information contained in respective multicast streams each includes a respective key identifier corresponding to said encrypted multimedia content identified by said desired content descriptor for uniquely identifying a respective key.

21. The method of claim 19 wherein said protection identification information contained in respective multicast streams each includes a respective key identifier corresponding to said encrypted multimedia content identified by said desired content descriptor for uniquely identifying a respective key and an address pointing to said digital rights server.

22. The method of claim 19 wherein said digital rights server provides a license file in response to said user access request, said license file including said respective key and a set of usage rules for limiting usage of said encrypted multimedia content.

23. The method of claim 19 further comprising the steps of:

coupling a distribution tunnel comprised of a virtual private network between said multicast server and an auxiliary distribution point;

transmitting said encrypted multimedia content to said auxiliary distribution point;

storing said encrypted multimedia content at said auxiliary distribution point; and decrypting and publicly displaying said encrypted multimedia content at said auxiliary distribution point.

\* \* \* \* \*